Aug. 28, 1962    A. W. KUIJVENHOVEN ETAL    3,051,056
AUTOMATIC GUN BREECH BLOCK CONTROL MECHANISM
Filed June 10, 1959    6 Sheets-Sheet 1

INVENTORS
AREND WILLEM KUIJVENHOVEN
ROY GILBERT VICKERS
BY Larson and Taylor

INVENTORS
AREND WILLEM KUIJVENHOVEN
ROY GILBERT VICKERS

BY Larson and Taylor

INVENTORS
AREND WILLEM KUIJVENHOVEN
ROY GILBERT VICKERS

Aug. 28, 1962  A. W. KUIJVENHOVEN ETAL  3,051,056
AUTOMATIC GUN BREECH BLOCK CONTROL MECHANISM
Filed June 10, 1959  6 Sheets-Sheet 4

INVENTORS
AREND WILLEM KUIJVENHOVEN
ROY GILBERT VICKERS

BY Larson and Taylor

INVENTORS
AREND WILLEM KUIJVENHOVEN
ROY GILBERT VICKERS

United States Patent Office 3,051,056
Patented Aug. 28, 1962

3,051,056
AUTOMATIC GUN BREECH BLOCK
CONTROL MECHANISM
Arend Willem Kuijvenhoven, Barrowby, Grantham, and Roy Gilbert Vickers, Grantham, England, assignors to Brevets Aero-Mecaniques, S.A., Geneva, Switzerland, a body corporate of Switzerland
Filed June 10, 1959, Ser. No. 819,385
Claims priority, application Great Britain June 23, 1958
7 Claims. (Cl. 89—132)

This invention relates to automatic gun breech block control mechanism of the kind in which a recoiling breech block is controlled by a sear movable into and from the path of the breech block respectively to prevent or allow return, i.e. forward movement, of the breech block to fire the gun.

In stopping fire of an automatic gun having a high rate of fire, for example as high as 1000 rounds per minute, there is only a very short time, a few milliseconds, available in each cycle of breech block movement for the sear to move into the path of the breech block and stop it in its return after recoil.

The sear usually has an angular movement, into and from the path of the breech block, but, to cushion the shock of abutment of the breech block, the sear may be mounted also for spring-loaded linear movement bodily, axially parallel to the breech block movement. Thus, the breech block and the sear each have independently a spring-controlled cycle of movement, liable to fluctuation in period, and they cannot be positively synchronised.

If the sear is slightly late in moving into the path of the breech block, it can happen that there is insufficient transverse overlap of the opposed shoulders, or equivalent abutment surfaces, of the sear and breech block and damage to either or both parts can be caused. For example, the leading edge alone of the sear shoulder may receive the full force of the breech block momentum and suffer fracture. This danger of damage is accentuated in a mechanism in which a relatively fixed abutment is provided to be encountered by the sear, during its forward axial movement, to increase the degree of engagement of the sear with the breech block. In such case, part of the sear may be trapped or jammed between the returning breech block and the relatively fixed abutment.

The object of the present invention is to provide a mechanism which obviates the risk of insufficient axial abutment between shoulders, or equivalent parts, of the sear and breech block.

For the above purpose, in an automatic gun breech mechanism having a breech block which recoils and returns axially and a sear movable into the path of the breech block to stop return of the breech block by axial opposition of shoulders, or equivalent abutments, on the sear and breech block respectively, according to the invention, one of said shoulders is provided with a spring-loaded guard arranged to yield on contact with the other shoulder either to bar entry of the sear into the path of the breech block, at any time during a given period of close approach of said shoulders in the return of the breech block, or, following entry of the sear into the path of the breech block prior to said period, to yield until said shoulders are in effective axial opposition.

Conveniently, the guard has the form of a lever pivoted, for limited angular movement about a transverse axis, to the sear or breech block on which it is provided and presenting a peripheral end surface for passing contact with the other shoulder, to bar late entry of the sear into the path of the breech block, and a side surface for axial abutment by the other shoulder after correctly timed entry of the sear into the path of the breech block. The lever is spring-loaded, on to a stop, axially away from the shoulder on which it is provided, conveniently by a compression-spring plunger thrusting axially or obliquely from such shoulder.

The invention will now be more fully described with reference to the accompanying drawings, in which.

Figure 1:
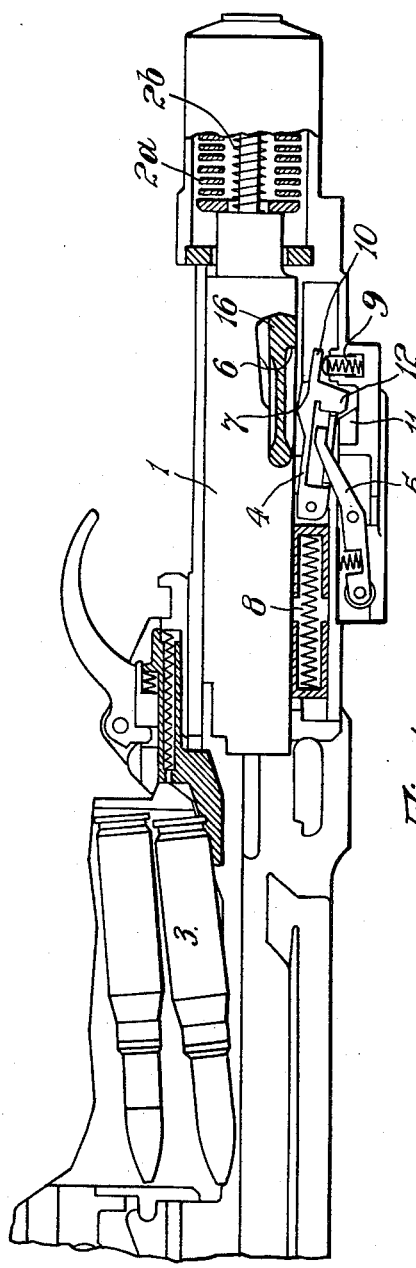
FIG. 1 is an axial section through the breech end of an automatic gun showing a breech block and sear mechanism of an existing kind and to which the invention is applicable.

The breech mechanism shown in FIG. 1 is of a known kind and includes a breech block 1 which, when a round is fired, recoils, to the right as seen in the drawing, and returns, under the thrust of springs $2^a$ and $2^b$, to load and fire the next round 3, unless the sear 4 is allowed, by release of a trigger-lever 5, to rise into the path of the breech block and stop its return by abutment of a shoulder 6 on the breech block against a shoulder 7 on the sear. To cushion the shock of such abutment, the sear is mounted for limited axial movement bodily against the thrust of a spring 8.

The sear, when released, is raised by a spring plunger 9, thrusting upwardly against a tongue 10 on the sear, and also, to increase the degree of engagement of the sear with the breech block, a relatively fixed ramp 11 is provided up which a heel 12 of the sear rides as it moves forward.

It will be seen that there is only a small interval, during the return of the breech block, in which the sear must rise fully in order to ensure effective axial opposition of the shoulders 6 and 7. The earliest point at which the sear can commence to rise is when the recess in the breech block leading to the shoulder 6 first opens to the shouldered part of the sear and if the sear is released before or at this point there is adequate time for the sear to rise and for the shoulders 6 and 7 to abut fully. With the breech block travelling forwards, if the sear is released after the shoulder 6 has passed the shoulder 7, the breech block itself prevents the sear from rising. There is however an intermediate point in the return of the breech block, as the shoulder 6 is closely approaching the shoulder 7, at which release of the sear does not leave sufficient time for the sear to rise and effectively oppose its shoulder 7 to the breech block shoulder 6. It is release of the sear between this intermediate point and the passing of the shoulder 7 by the shoulder 6, which can result in damage by edge-abutment of the shoulders 6 and 7 and sometimes jamming of the sear against the ramp 11.

The cycle of movement of the breech block does not have a constant period, due to such variables as temperature and propellant force as between one round and another, and in addition, in this particular mechanism, the sear also has a variable period of movement due to its angular and axial movement and spring loading.

Consequently, it has not been found possible to devise any means of synchronising release of the sear with the return of the breech block so as to preclude the possibility of edge-abutment of the shoulders 6 and 7.

The present invention provides a guard which, in effect, bridges the critical period between the above-described intermediate point at which the breech block shoulder 6 has too closely approached the sear shoulder 7 and the actual passing of the shoulder 6.

In the somewhat diagrammatic illustration of FIGS. 2 to 9, the sear 4 has been modified by the formation of a central axial slot 4a through the shoulder 7 and the insertion of a guard lever 13 pivoted by a pintle 14 passed transversely through the body of the sear. A compression spring plunger 15, housed in an axial recess in the sear, tends constantly to rock the guard 13 away from the shoulder 7 up to a limit at which a heel 13a of the guard abuts against the front wall of the slot 4a.

The action of the guard 13 in barring late entry of the sear into the path of the breech block is shown in successive stages by FIGS. 2 to 5.

Figure 2:
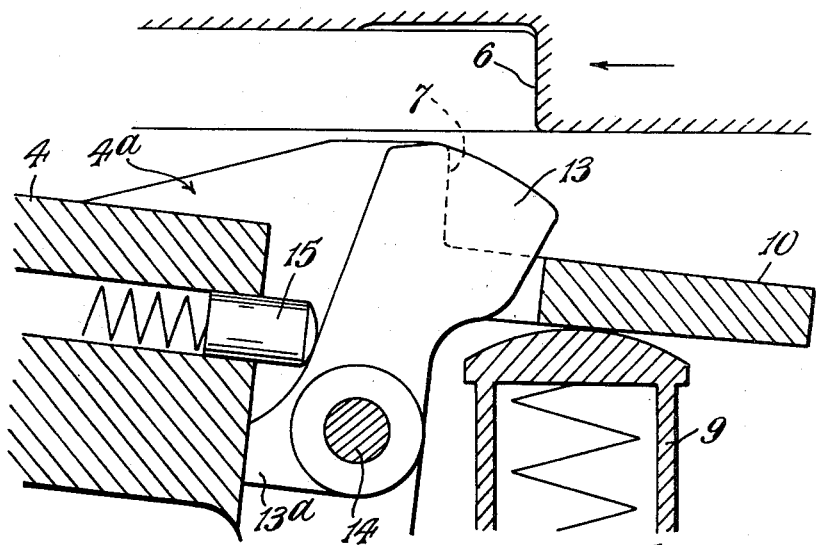
FIGS. 2 to 5 are a series of similar fragmentary axial sections showing, somewhat diagrammatically, successive stages of the guard on a sear, as modified by the present invention, barring late entry of the sear into the path of the breech block.

FIG. 2 shows the position when the sear is released late and commences to rise just as the shoulder 6 is closely approaching the shoulder 7.

Figure 3:
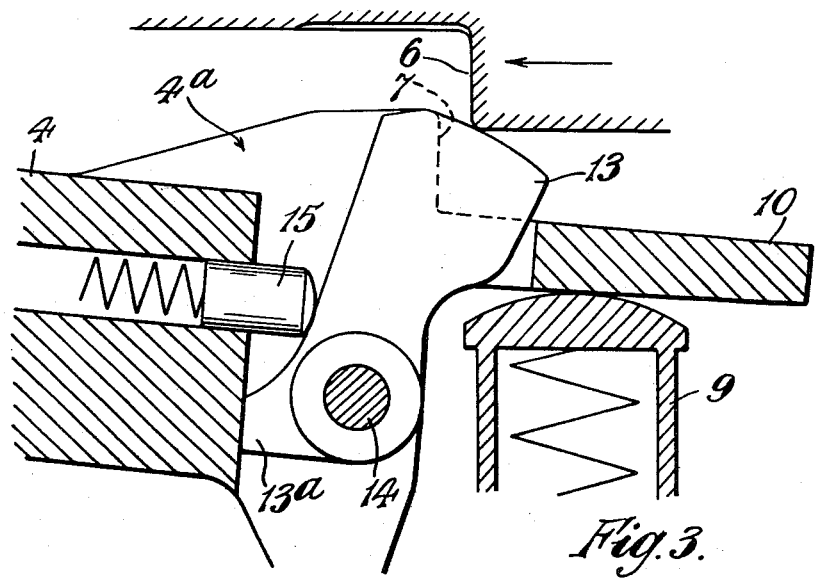

FIG. 3 shows the slightly later position immediately before the shoulders 6 and 7 would have met edge-to-edge but in this case the peripheral end surface of the guard 13 has encountered the edge of the shoulder 6 and this has prevented the sear from rising any further.

Figure 4:
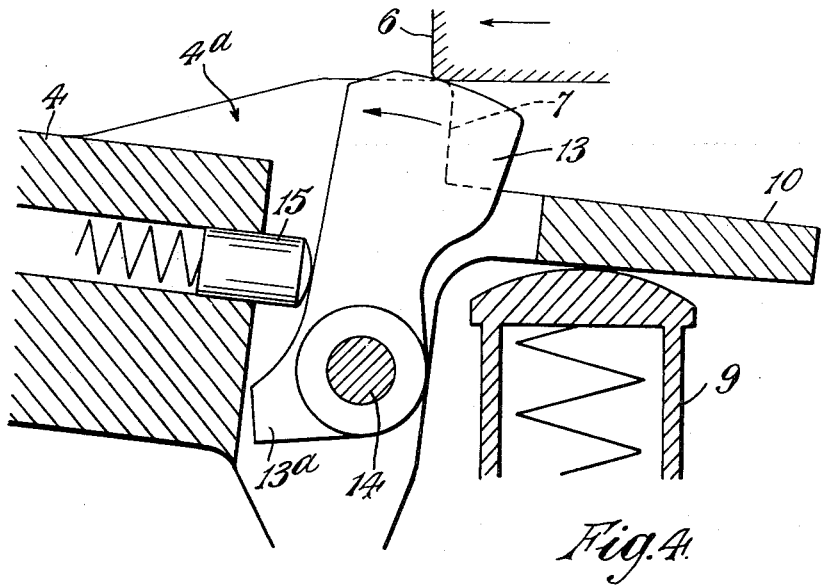

In FIG. 4, the guard 13 is being rocked, about its pintle 14 against the thrust of its plunger 15, by the forward movement of the shoulder 6 of the breech block and the sear has thereby been depressed slightly, against the thrust of its plunger 9.

Figure 5:
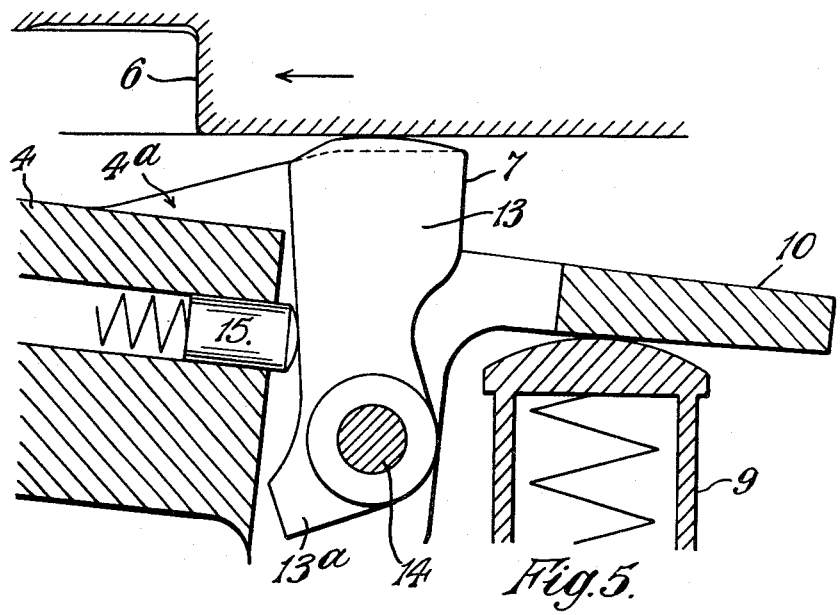

In FIG. 5, the shoulder 6 has passed the shoulder 7 and guard 13, the latter now almost fully rocked against the thrust of its plunger 15, and the breech block is completing its return stroke, holding the sear depressed and out of harm.

The action of the guard 13 when the sear is released to rise before the critical point in the approach of the shoulder 6, is shown by FIGS. 6 to 9.

Figure 6:
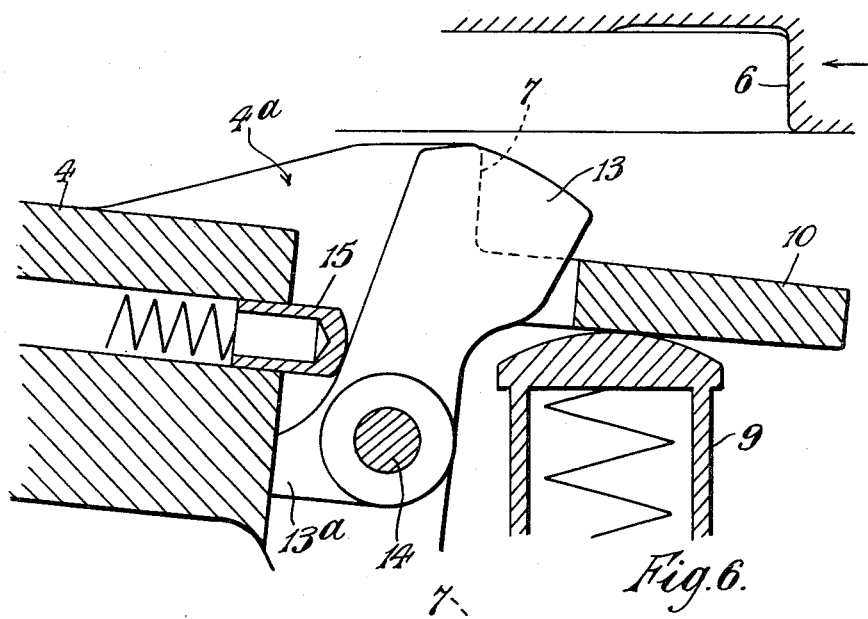
FIGS. 6 to 9 are a series of views, similar to FIGS. 2 to 5, showing successive stages of correctly timed entry of the sear into the path of the breech block.

In FIG. 6, the sear has been released and is commencing to rise towards the recess leading to the shoulder 6.

Figure 7:
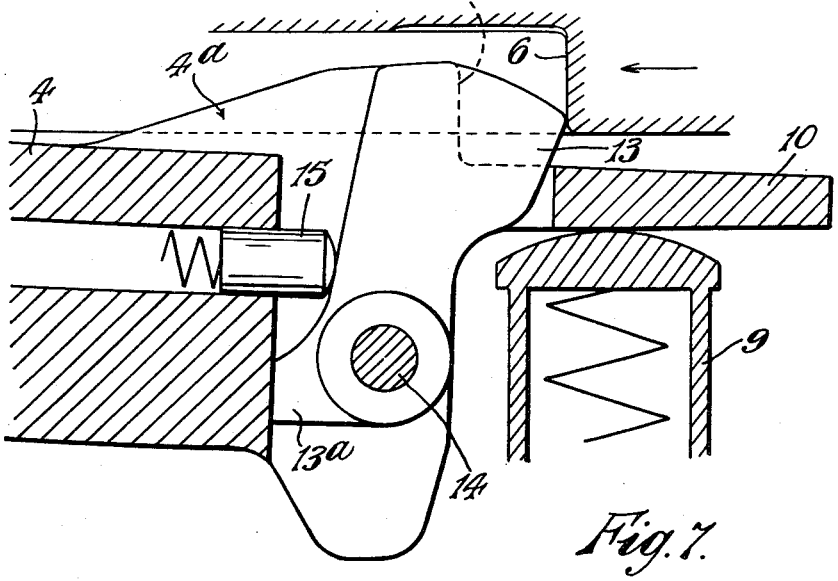

In FIG. 7, the shoulder 6 has encountered the edge of the guard 13 which can at once yield by rocking about its pintle 14 against the thrust of its plunger 15, the latter being substantially less than the momentum of the returning breech block.

Figure 8:
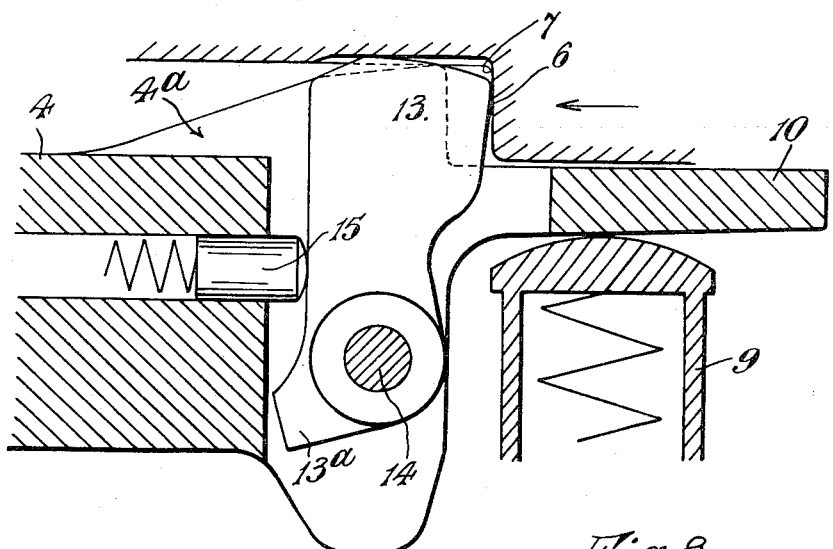

FIG. 8 shows how, in yielding, the guard 13 moves up the side of the shoulder 6, giving time for the sear to complete its rising movement.

Figure 9:
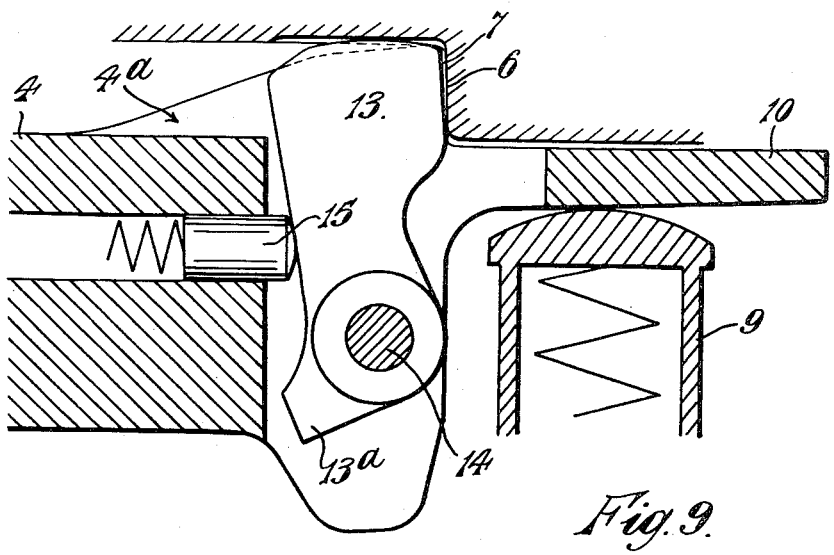

In FIG. 9, the sear has completed its rise, the guard 13 has almost fully rocked against the thrust of its plunger 15 and the shoulder 6 of the breech block has contacted the shoulder 7 of the sear in effective axial opposition to stop the breech block.

Figure 12:
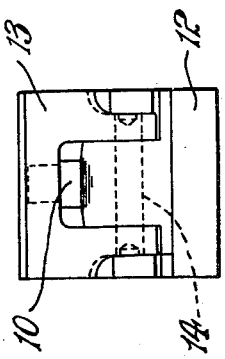
FIGS. 10, 11 and 12 are respectively a side elevation, a plan and a rear end elevation showing, as an example, one construction of a sear modified by the addition of a guard in accordance with the present invention.
Figure 10:
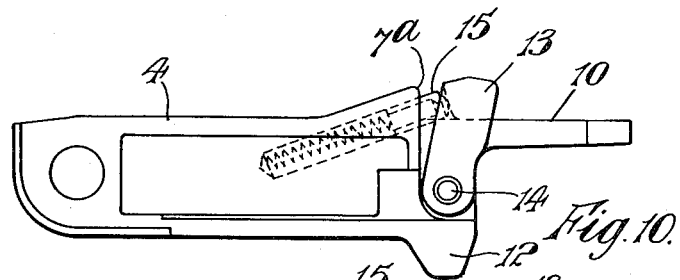
Figure 11:
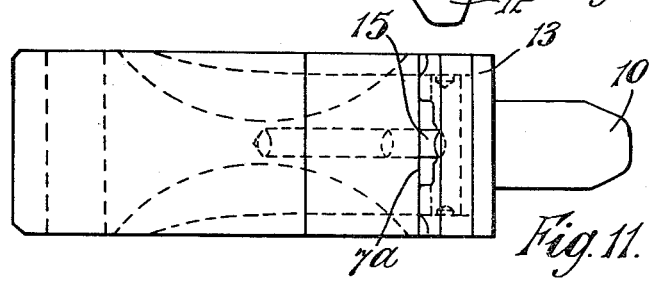

As mentioned above, FIGS. 2 to 9 are somewhat diagrammatic and a constructional example of one way in which the guard can be applied to the sear is shown by FIGS. 10 to 12. Part of the shoulder of the sear, corresponding to the shoulder 7 in FIGS. 2 to 9, is cut away, to the line 7a, and is replaced by an inverted U-shaped guard lever 13 pivoted by a pintle 14 passed transversely through the body of the sear and riveted by its recessed ends into the limbs of the guard 13. A compression spring plunger 15, housed in an obliquely axial recess in the sear, tends constantly to rock the guard 13 away from the sear up to a limit at which the web of the guard abuts against the top of the sear tongue 10.

The sear shown by FIGS. 10 to 12 operates in the same way as described with reference to FIGS. 2 to 9 except that in the stop position as shown by FIG. 9 the guard 13, replacing part of the shoulder 7, is clamped between the shoulder 6, not shown, and the cut-back shoulder 7.

An important constructional feature of the sear of FIGS. 10 to 12 is that the guard 13 replaces fully a transverse part of the sear shoulder and presents surfaces extending the full width of the sear for contact with the breech block shoulder 6 both in preventing and effecting engagement of the gear with the breech block. Thus, the strength of the sear is not reduced and the contact or abutment load per unit area on the sear is not increased by incorporation of the guard 13. In this respect, the arrangement shown by FIGS. 2 to 9, in which the sear shoulder is slotted to receive a guard as a tongue, is weaker but it has been used for illustration to enable the operation of the guard 13 to be seen in relation to the shoulder of an existing sear.

Figure 13:
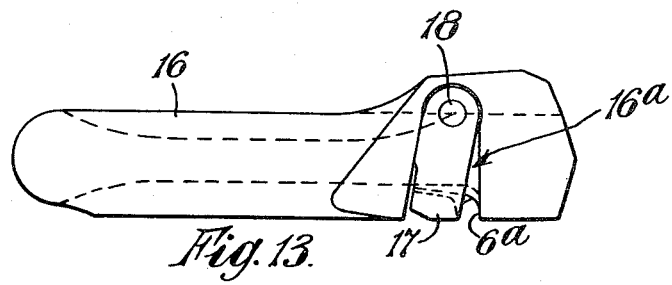
FIGS. 13 and 14 are respectively a side elevation and an axial section showing, as an example, the construction of a part of a breech block modified by the addition of a guard in accordance with the present invention.
Figure 14:
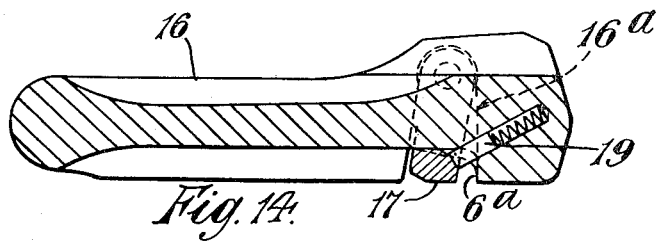

One way in which a guard as provided by the invention can be applied to the breech block, instead of to the sear, is shown, as an example, by FIGS. 13 and 14. These figures show a part 16 of the breech block, called the locking piece because it also serves to lock the breech block forward at the instant of firing, which is usually recessed to provide the shoulder, corresponding to the shoulder 6 in FIGS. 2 to 9. In this case, the shoulder has been cut back to 6a and the sides of the locking piece each formed with a recess 16a to receive one of the limbs of a U-shaped guard lever 17 pivoted on a pintle 18 passed transversely through the body of the locking piece 16. A compression spring plunger 19, housed in an obliquely axial recess in the locking piece, tends constantly to rock the guard 17 away from the shoulder 6a up to a limit at which the limbs of the guard abut against the forward end walls of the recesses 16a.

By comparison with FIGS. 2 to 9, it can be seen that the guard 17 will either bar late entry of the shoulder 7, not shown, of an ordinary sear into the recess of the locking piece or, after correctly timed entry of the shoulder 7, will yield on contact therewith until clamped between the shoulder 7 and the shoulder 6a in effective axial opposition to stop the breech block.

We claim:

1. In an automatic gun breech mechanism, a sear disposed in said mechanism and having a breech-block arresting shoulder, a guard movably mounted on said sear with a component of movement axial relatively to said shoulder, and a spring operative on said guard for movement thereof away from said shoulder.

2. A sear according to claim 1, in which said guard is a lever pivoted, for limited angular movement, about an axis transverse to said sear, said lever having a peripheral end surface and side surfaces directed axially of said sear, all of said surfaces extending the full width of said shoulder.

3. In an automatic gun including a breech block member movable axially along a recoil and return path, an axially-directed abutment on said breech block member, a sear member movable into and from said path and an abutment on said sear member directed axially oppositely to said abutment on said breech block member, said abutments being adapted for mutual axial opposition to arrest return of said breech block member when said sear is in said path; a guard movably mounted on one of said members with a component of movement axial relatively to said abutment of said one member on which said guard is mounted, and a spring operative on said guard for movement thereof away from said abutment of said one member.

4. In an automatic gun breech mechanism according to claim 3, a lever constituting said guard and pivoted on said one member about an axis transverse thereto, said lever having a peripheral end surface directed substantially radially outwards from said axis and towards said path and a side surface directed axially for contact with said abutment of the other of said members.

5. In an automatic gun breech mechanism according to claim 4, a shoulder constituting each said abutment, the said end and side surfaces of said lever extending the full width of the shoulder of the member on which the lever is pivoted.

6. In an automatic gun breech mechanism according to claim 3, a locking piece having a shoulder to coact with the sear member, a guard movably mounted on said locking piece with a component of movement axial relatively to said shoulder, and a spring operative on said guard for movement thereof away from said shoulder.

7. A locking piece according to claim 6, in which said guard is a lever pivoted, for limited angular movement, about an axis transverse to said locking piece, said lever having a peripheral end surface and side surfaces directed axially of said locking piece, all of said surfaces extending the full width of said shoulder.

References Cited in the file of this patent

UNITED STATES PATENTS

| | | |
|---|---|---|
| 2,159,126 | Birkigt | May 13, 1939 |
| 2,759,399 | Manzo Sal | Aug. 21, 1956 |

FOREIGN PATENTS

| | | |
|---|---|---|
| 716,924 | Germany | Feb. 2, 1942 |